United States Patent
Sakurada (10) Patent No.: US 12,330,435 B2
(45) Date of Patent: Jun. 17, 2025

(54) RECORDING DEVICE AND RECORDING METHOD

(71) Applicant: SEIKO EPSON CORPORATION, Tokyo (JP)

(72) Inventor: Kazuaki Sakurada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 166 days.

(21) Appl. No.: 18/066,126

(22) Filed: Dec. 14, 2022

(65) Prior Publication Data
US 2023/0182495 A1    Jun. 15, 2023

(30) Foreign Application Priority Data

Dec. 15, 2021   (JP) .................. 2021-203170

(51) Int. Cl.
*B41J 29/393*   (2006.01)
*B41J 3/407*    (2006.01)
*G06K 15/02*    (2006.01)

(52) U.S. Cl.
CPC .......... *B41J 29/393* (2013.01); *B41J 3/4078* (2013.01); *G06K 15/021* (2013.01); *G06K 15/027* (2013.01)

(58) Field of Classification Search
CPC ..... B41J 29/393; B41J 3/4078; G06K 15/021; G06K 15/027
See application file for complete search history.

(56) References Cited

U.S. PATENT DOCUMENTS

2018/0236799 A1   8/2018  Kanai
2020/0269566 A1*  8/2020  Hobo .................. B41J 11/008

FOREIGN PATENT DOCUMENTS

JP   2018-134778 A   8/2018

* cited by examiner

*Primary Examiner* — Scott A Richmond
(74) *Attorney, Agent, or Firm* — WORKMAN NYDEGGER (57) ABSTRACT

A control unit acquires an interval between weaving threads in a woven fabric, and changes an interval between ruled lines constituting a ruled line group in a test pattern on the basis of the acquired interval between weaving threads. When the interval between weaving threads in the woven fabric matches the interval between ruled lines constituting the ruled line group in the test pattern or when these intervals are in the relationship of integer multiple, ruled lines in the test pattern match the interval between weaving threads in the woven fabric. When they match, it is difficult to recognize the difference between the test pattern and the shadow of the weaving thread in the woven fabric. The control unit changes the interval between ruled lines constituting the ruled line group in the test pattern on the basis of the interval between weaving threads. This enables the difference recognition to be less difficult.

5 Claims, 10 Drawing Sheets

RECORDING DEVICE AND RECORDING METHOD

The present application is based on, and claims priority from JP Application Serial Number 2021-203170, filed on Dec. 15, 2021, the disclosure of which is hereby incorporated by reference herein in its entirety.

BACKGROUND

1. Technical Field

The present disclosure relates to a recording device such as a printing apparatus, and a recording method.

2. Related Art

JP-A-2018-134778 discloses a technique configured to adjust a landing position of ink droplets discharged from a liquid ejecting device. In the JP-A-2018-134778, after a test pattern including predetermined ruled lines is printed on a recording medium by the liquid ejecting device, an image is acquired using an image acquiring unit such as an RGB camera, and image processing is performed to the acquired image to work out information about the amount of misalignment in landing, and calculate a correction value used to correct the landing position.

In some cases, the liquid ejecting device may perform printing on a woven fabric as a recording medium. When printing is performed on a fabric that is a woven fabric as a recording medium, if the interval between weaving threads in the woven fabric matches the interval between ruled lines in a test pattern or these intervals are in a relationship of an integer multiple, it is difficult to recognize a difference between the ruled line of the test pattern and the shadow of the weaving thread of the woven fabric, which results in a problem that it is not possible to obtain an appropriate correction value.

The present disclosure provides a recording device and a recording method, which make it possible to accurately calculate a correction value used to correct the landing position on a woven fabric.

SUMMARY

The present disclosure includes a recording unit configured to record, on a woven fabric, a test pattern including a ruled line group having a predetermined interval, and a control unit configured to control recording by the recording unit, in which the control unit acquires an interval between weaving threads in the woven fabric, and changes an interval between ruled lines constituting the ruled line group in the test pattern on a basis of the acquired interval between weaving threads.

In the configuration described above, the control unit acquires an interval between weaving threads in the woven fabric, and changes an interval between ruled lines constituting the ruled line group in the test pattern on the basis of the acquired interval between weaving threads. When the interval between weaving threads in the woven fabric matches the interval between ruled lines constituting the ruled line group in the test pattern or when these intervals are in the relationship of integer multiple, ruled lines in the test pattern match the interval between weaving threads in the woven fabric. When they match, it is difficult to recognize the difference between the test pattern and the shadow of the weaving thread in the woven fabric. The control unit changes the interval between ruled lines constituting the ruled line group in the test pattern on the basis of the interval between weaving threads. This enables the difference recognition to be less difficult.

DESCRIPTION OF EXEMPLARY EMBODIMENTS

Below, embodiment according to the present disclosure will be described with reference to the drawings.

Figure 1:
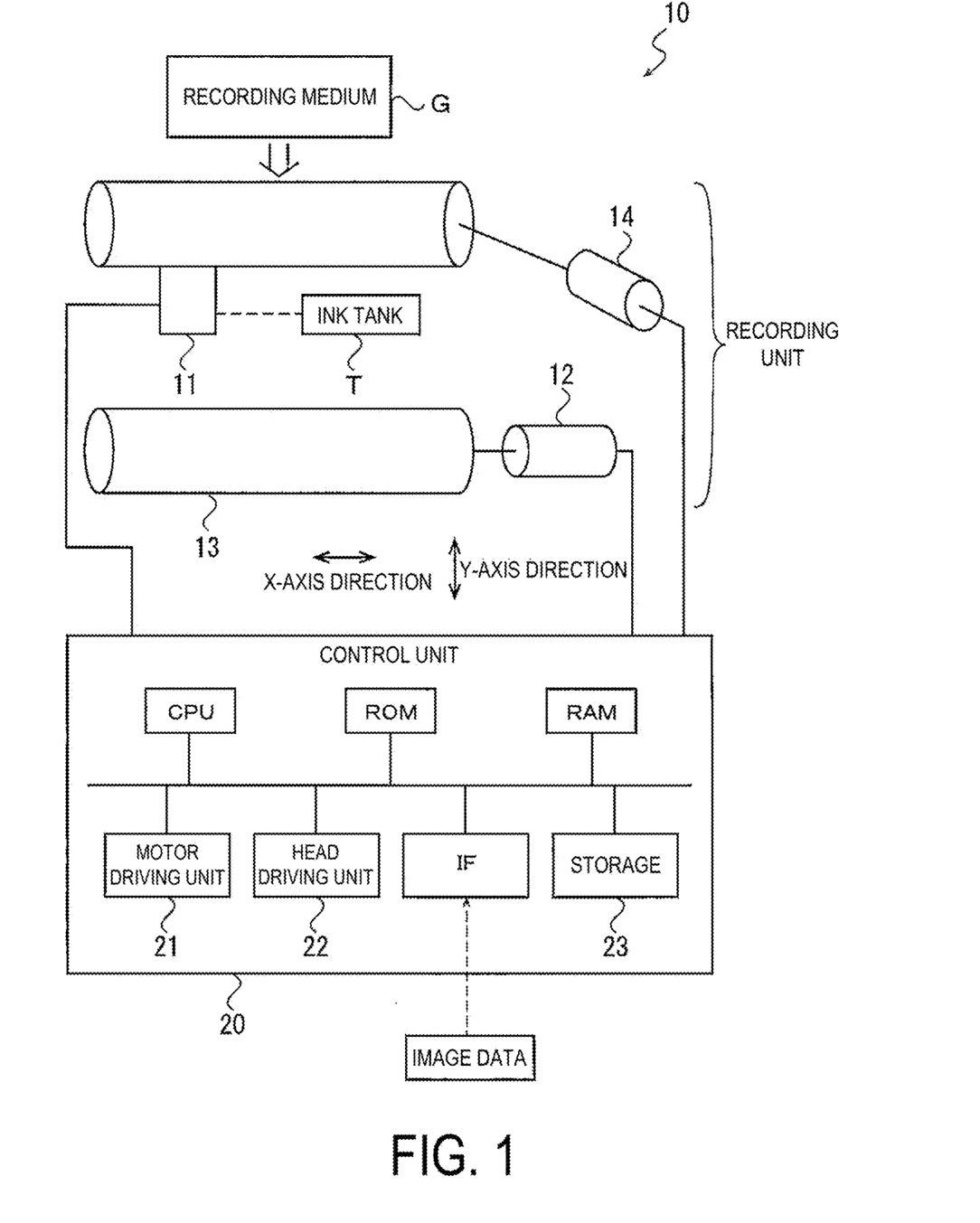
FIG. 1 is a schematic block diagram illustrating a printing apparatus to which a recording device is applied.

FIG. 1 is a schematic block diagram illustrating a printing apparatus to which a recording device according to one embodiment of the present disclosure is applied.

In this drawing, a printing head 11 of a printer (recording device) 10 discharges, from nozzles that are not illustrated, four colors or six colors of color ink supplied from an ink tank T. The color ink is attached on a recording medium G to draw dots. The printing head 11 is opposed to a platen 13 configured to be rotatably driven by a platen motor 12, and the recording medium G is conveyed so as to intersect the printing head 11. By using a main scanning motor 14, the printing head 11 is able to perform reciprocating operation parallel to the platen 13. The printing head 11 is reciprocatingly driven in the X-axis direction, and the recording medium is driven in the Y-axis direction, which makes it possible for the nozzles of the printing head 11 to discharge color ink at given locations of the surface of the recording medium. The X-axis direction in which the printing head 11 performs reciprocating operation is referred to as a main scanning direction, and the Y-axis direction in which the recording medium G is driven is referred to as a sub scanning direction. The printing head 11, the platen motor 12, the platen 13, the main scanning motor 14, and the like correspond to the recording unit.

The present embodiment employs a recording device in which the recording medium G is driven by the platen 13. However, it is possible to employ a recording device of a flat head type in which the recording medium G is fixed on the flat plate, and the flat plate is driven in the Y-axis direction while the printing head 11 is being driven in the X-axis direction, or a recording device in which a long recording medium G wound in a roll form is brought into contact with the front surface of a roller having a hollow cylindrical shape, and in this state, the roller rotates to convey the recording medium G, whereby a recording process is ended.

Note that the trajectory of the color ink is influenced by the configuration in which the color ink is discharged while the printing head 11 is being moved, the disturbance of the airflow occurring in association with the conveyance of the recording medium, and the direction in which the nozzles are formed. This may result in a state in which the landing position is misaligned from the originally targeted location. This misalignment of the landing position is detected by causing a test pattern including a ruled line group to be printed on the recording medium to perform image analysis to this test pattern.

Figure 2:
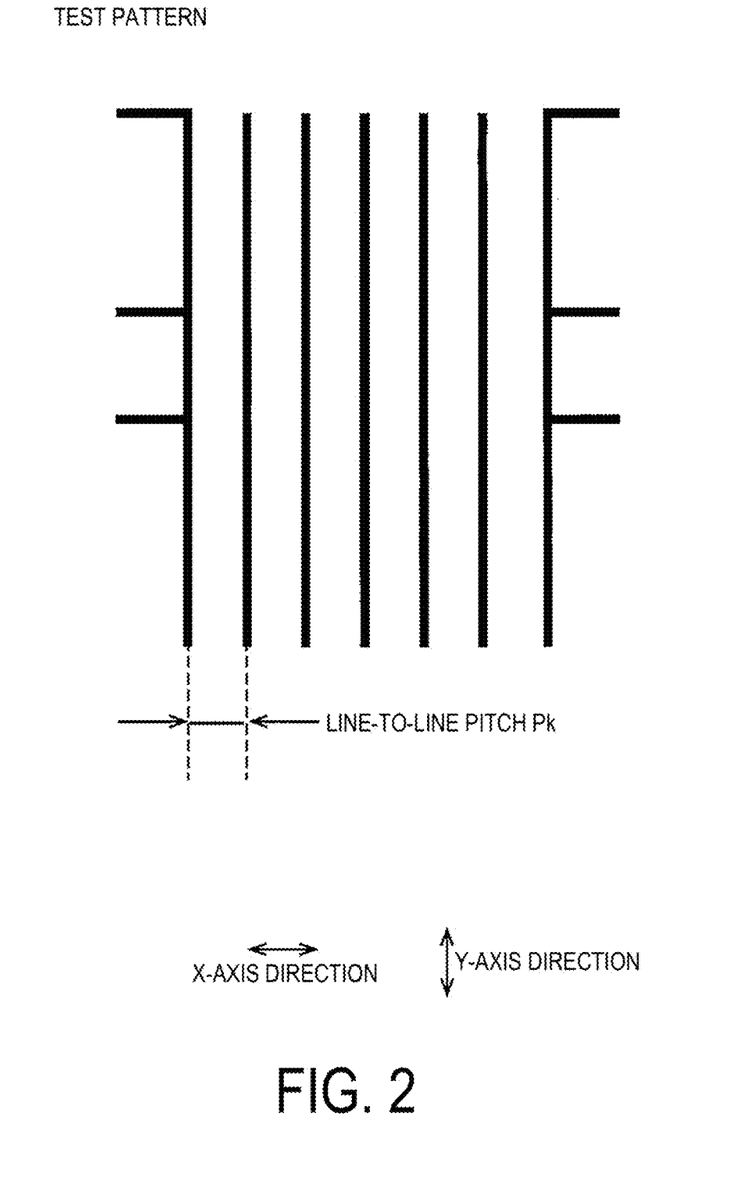
FIG. 2 is a diagram illustrating a portion of a test pattern.

FIG. 2 illustrates a portion of the test pattern.

Ruled lines of the test pattern are drawn by attaching dot-shaped color ink so as to align in a predetermined direction. When the trajectory of the color ink discharged from each of the nozzles is misaligned, dots that are supposed to be attached so as to align are attached in a manner that these dots do not align. By acquiring this state as an image to perform image analysis, it is possible to detect the misalignment of the landing position. In the test pattern illustrated in the drawing, seven straight lines are drawn as ruled lines in parallel in the X-axis direction, and several straight lines are drawn as ruled lines in the Y-axis direction. The ruled lines of the seven straight lines in the X-axis direction and the ruled lines of the several straight lines in the Y-axis direction correspond to the ruled line group. In addition, the intervals between ruled lines of the seven straight lines in the X-axis direction match, and are a ruled line pitch Pk.

Next, a control unit 20 controls driving of the platen motor 12, the main scanning motor 14, and the printing head 11. In addition to main configurations that constitute a computer and include a CPU, a ROM, a RAM, and an IF, the control unit 20 includes a motor driving unit 21 configured to output electrical power for driving the platen motor 12 and the main scanning motor 14, and a head driving unit 22 configured to output the driving electric power to driving elements corresponding to each of the nozzles of the printing head 11. In addition, the control unit 20 includes a storage 23 that is a nonvolatile storage region configured to store data such as a test pattern.

In the present embodiment, the control unit 20 acquires image data from the outside to analyze the image data, thereby computing a correction value used to correct the misalignment of the landing position. The control unit 20 communicates with an external device through the IF to acquire the image data. It is needless to say that the control unit 20 itself may include an imaging element or it may be possible to employ a configuration in which an imaging element is mounted at the printing head 11 and the control unit 20 acquires data from this imaging element.

Figure 3:
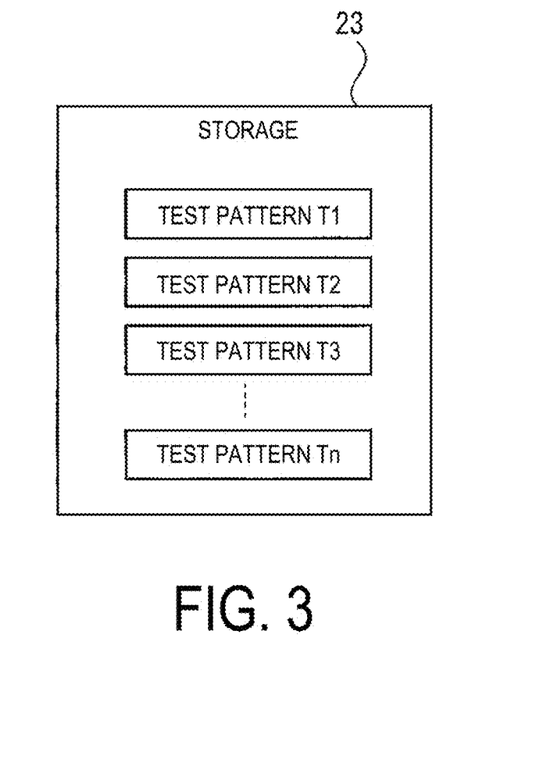
FIG. 3 is a diagram illustrating a storage.

FIG. 3 illustrates a storage.

The storage 23 holds various types of data. In the present embodiment, the storage 23 holds a plurality of test patterns T1 to Tn (collectively referred to as a test pattern T). Each test pattern T is created so as to have the ruled line pitches Pk described above differing from each other. Since the ruled line pitches Pk differ from each other, calculation of the correction value for the misalignment of landing differs. However, the calculation method is a known technique, and hence, explanation thereof will not be made.

Figure 4:
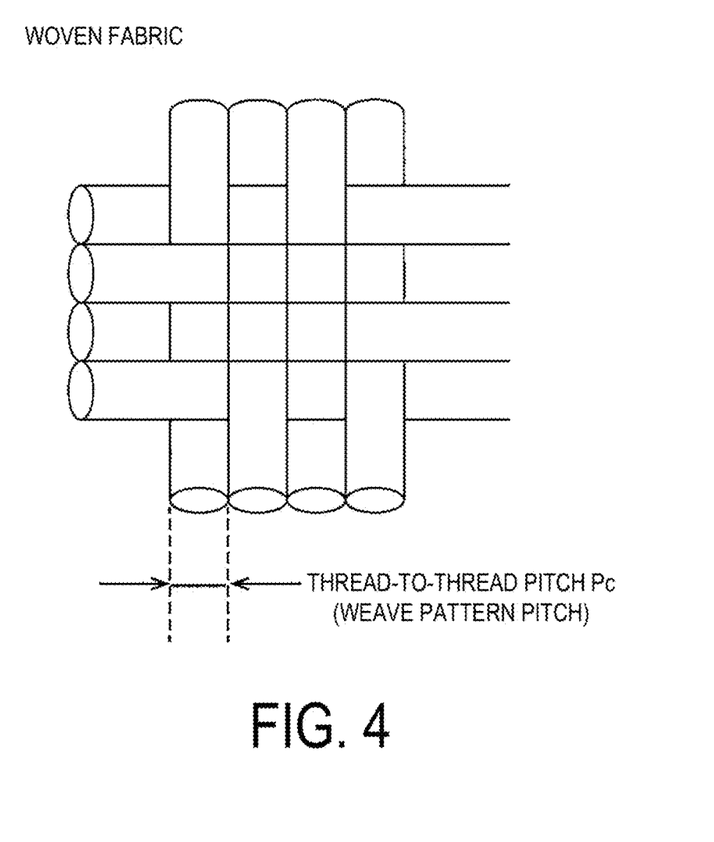
FIG. 4 is a diagram illustrating a portion of a woven fabric in an enlarged manner.

FIG. 4 illustrates a portion of a woven fabric in an enlarged manner.

This diagram is used to explain the interval between warp threads. Actually, as for the patterns in which warp threads and weft threads intersect each other, it is possible to use various types of patterns. By giving one example, weaving threads are configured such that warp threads are set so as to align in a predetermined array direction at certain intervals, and weft threads are woven as appropriate. Here, the "interval between weaving threads" and the "pitch between weaving threads" are used to represent the same meaning. For example, the term represents an interval between centers of threads in a direction in which individual threads are arrayed. Of course, it may be possible to use a term "interval of weave pattern between threads". At least the term does not represent a gap itself between arrayed threads nor represent the width of a thread. The drawing illustrates a thread-to-thread pitch Pc (an item called a weave pattern pitch Pc has the same meaning).

Figure 5:
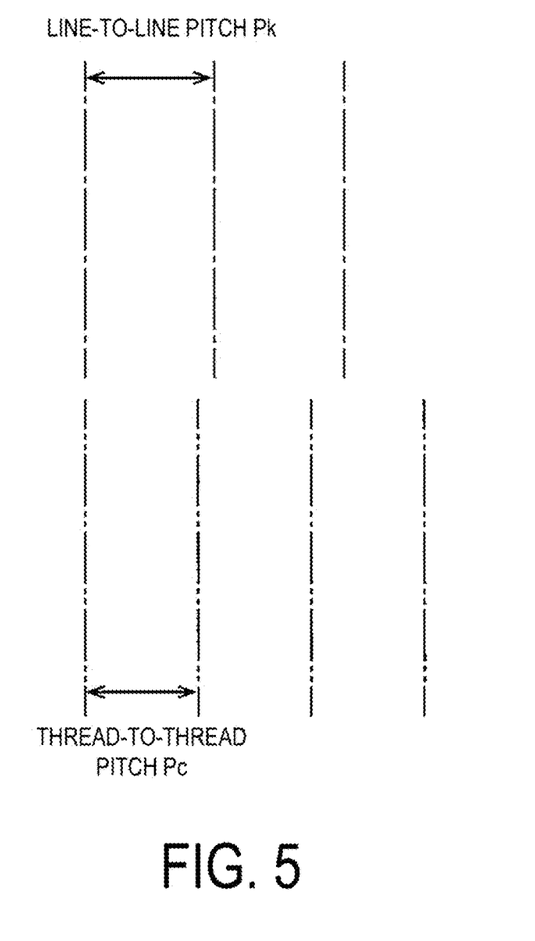
FIG. 5 is a diagram illustrating a ruled line pitch Pk and a thread-to-thread pitch Pc.

FIG. 5 illustrates the ruled line pitch Pk and the thread-to-thread pitch Pc when the present embodiment is implemented.

As illustrated in this drawing, by implementing the present embodiment, the ruled line pitch Pk≠the thread-to-thread pitch Pc establishes.

Figure 6:
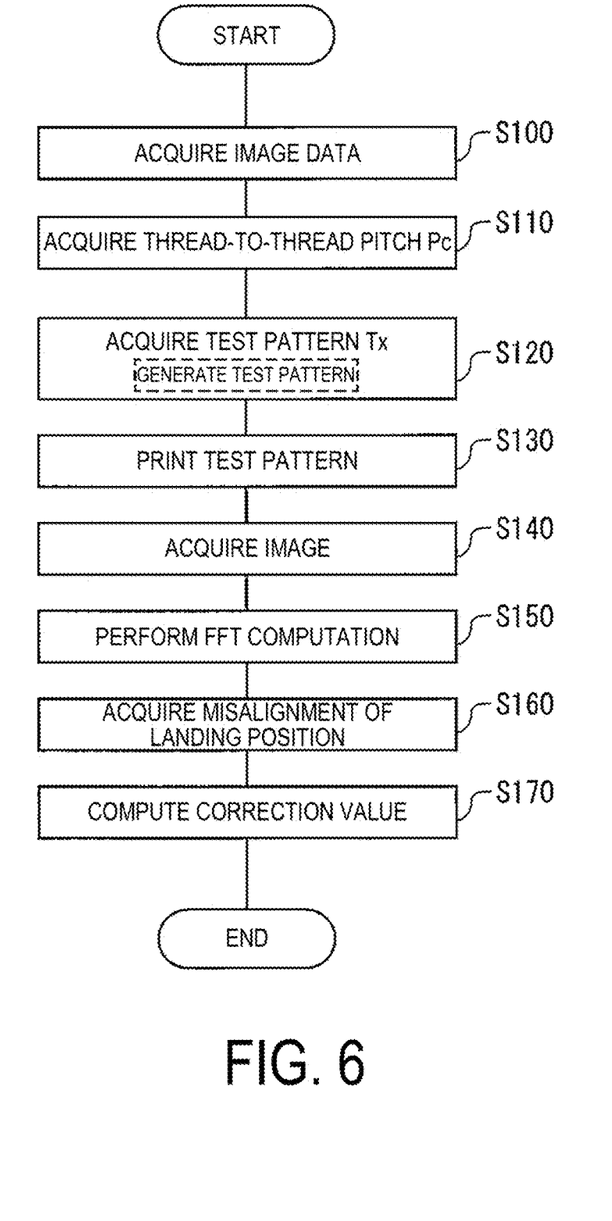
FIG. 6 is a flowchart showing a control program that a control unit implements.

FIG. 6 is a flowchart showing a control program that the control unit performs.

The CPU of the control unit 20 performs a program that follows the flowchart shown in this drawing. First, in step S100, the CPU acquires image data. The image data is image data obtained by imaging a woven fabric serving as the recording medium G. In step S110, the CPU acquires the thread-to-thread pitch Pc on the basis of the image data. Various types of methods can be used to acquire the thread-to-thread pitch Pc. Pixel data in a direction in which weaving threads are arrayed in the image data are acquired, and fast Fourier transform is applied to obtain the frequency distribution. Although various frequency components exist in an image of the woven fabric, the weaving threads are regularly arrayed at constant intervals, and hence, it is estimated that the frequency components thereof increase. Thus, it is possible to determine the thread-to-thread pitch Pc by using, as a candidate, a frequency having a large frequency component value as compared with a predetermined threshold value, and narrowing down the range of the thread-to-thread pitch of the woven fabric into an appropriate range.

Meanwhile, the thread-to-thread pitch Pc can be known on the basis of the fabric itself, and a user may input, as data, the thread-to-thread pitch Pc of this fabric. In this manner, it may be possible to use a method of working out on the basis of the image data or a method of inputting it manually.

In step S120, the CPU acquires a test pattern Tx best suited for the recording medium. A condition for the test pattern Tx best suited for the recording medium includes a first condition of "not including a ruled line group having the ruled line pitch Pk that falls in an integer multiple of the thread-to-thread pitch Pc of the woven fabric".

In addition, the condition further includes a second condition in which "a multiple of the least common multiple of the thread-to-thread pitch Pc of the woven fabric and the ruled line pitch Pk is a value greater than a predetermined threshold value".

It is expected that a plurality of test patterns T are selected as candidates under the conditions described above. In this case, it is possible to select a test pattern that comes first and does not match. In addition, there may be a plurality of test patterns T that meet the first condition but do not meet the second condition, that is, the multiple is equal to or less than a predetermined threshold value. At this time, it may be possible to select a test pattern in which the ruled line pitch Pk is an interval that has the least frequency of occurrence of overlapping between a ruled line and the weave pattern. For example, when the thread-to-thread pitch Pc is 6, the ruled line pitch Pk of the first test pattern T1 is 3, and the ruled line pitch Pk of the second test pattern T2 is 4, the second test pattern T2 results in a less frequency of occurrence of overlapping between a ruled line and the weave pattern. Thus, the second test pattern T2 is selected.

In this manner, it can be said that the first condition is a process of performing control such that the acquired interval Pc between weaving threads and the interval Pk between ruled lines constituting a ruled line group in the test pattern T do not match.

In addition, it can be said that, when a plurality of test patters are left as candidates in the second condition, a process of "selecting a test pattern in which the ruled line pitch Pk is an interval having the least frequency of occurrence in which a ruled line and the weave pattern overlap with each other" is a process of including a plurality of test patterns T, obtaining the number of occurrences in which the acquired interval Pc between weaving threads and an interval between ruled lines Pk that constitute a ruled line group in each of the test patterns T match, and selecting a test pattern in which this number of occurrences is small.

In any of the conditions, it can be said that the control unit 20 acquires the interval Pc between weaving threads in a woven fabric, and changes the interval between ruled lines Pk that constitute a ruled line group in the test pattern T on the basis of the acquired interval Pc between weaving threads.

The CPU acquires the selected test pattern Tx from the storage 23, and in step S130, causes printing to be performed on the woven fabric serving as a recording medium by using this test pattern Tx. After the test pattern Tx is printed, in step S140, an image of a portion of the woven fabric on which printing is performed is acquired. Then, in step S150, fast Fourier transform (FFT) computation is performed to the image.

Figure 7:
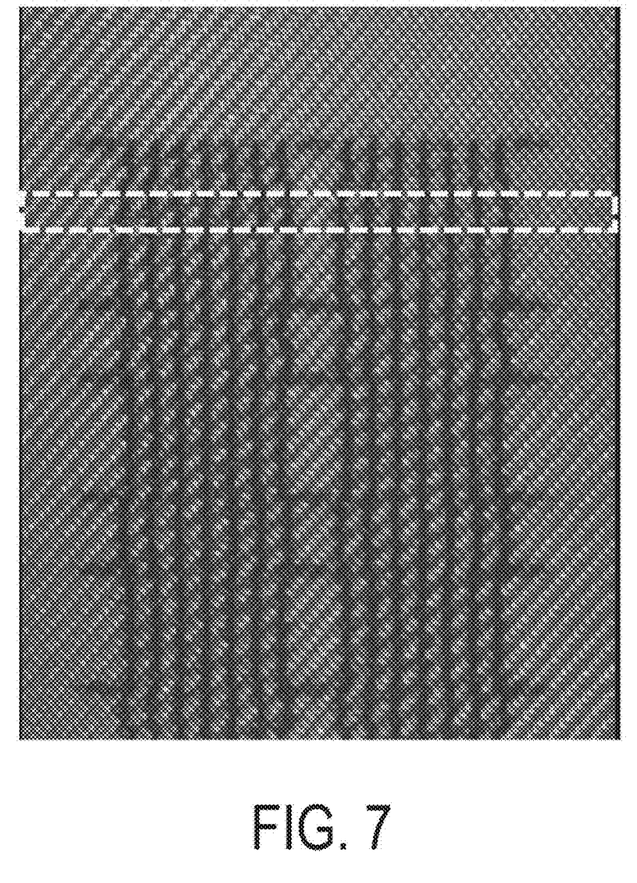
FIG. 7 is a diagram showing an image of a woven fabric when a process of changing a test pattern is not performed.
Figure 8:
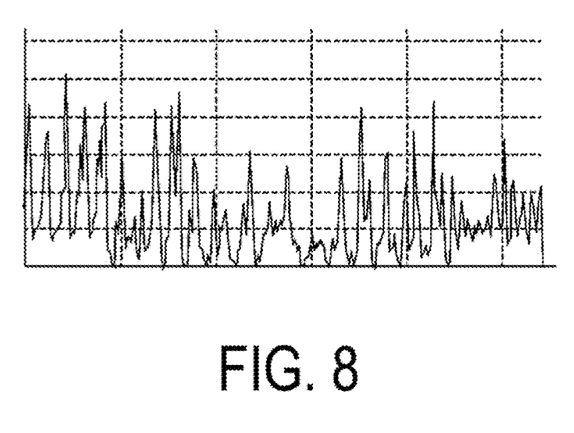
FIG. 8 is a diagram showing a computation result when fast Fourier transform computation is performed on the basis of image data.

FIG. 7 illustrates an image of a woven fabric when a process of changing test patterns is not performed. FIG. 8 illustrates a computation result when fast Fourier transform computation is performed on the basis of image data on this image.

Specifically, pixel data between dashed lines illustrated in FIG. 7 are acquired as plot data, and fast Fourier transform (FFT) computation is performed. This case resulted in a state of "including a ruled line group in which a ruled line pitch Pk is an integer multiple of the thread-to-thread pitch Pc in the woven fabric". Thus, it is not possible to remove the frequency component based on the thread-to-thread pitch of the woven fabric in a manner that does not influence the ruled line pitch Pk. This results in a state in which a component value appears in many frequency components, and it is difficult to perform computation for misalignment of the landing position.

Figure 9:
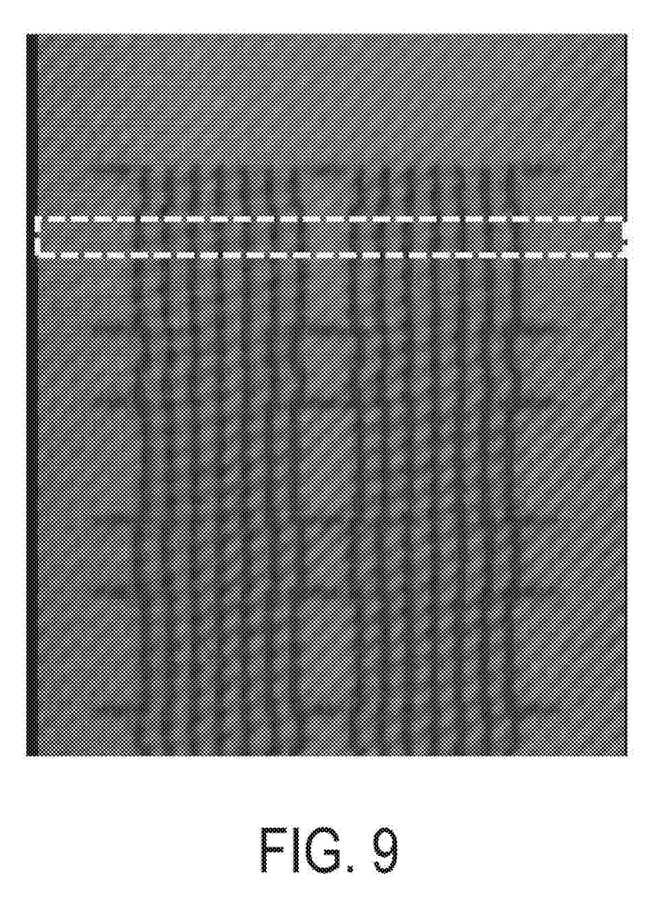
FIG. 9 is a diagram showing an image of a woven fabric when a process of changing a test pattern is performed.
Figure 10:
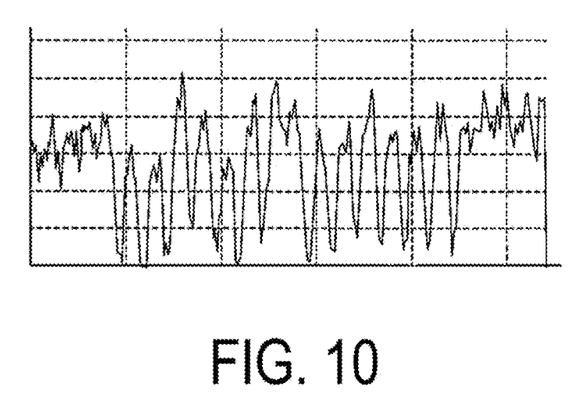
FIG. 10 is a diagram showing a computation result when fast Fourier transform computation is performed on the basis of image data.

FIG. 9 illustrates an image of a woven fabric when a process of changing test patterns is performed. FIG. 10 illustrates a computation result when fast Fourier transform computation is performed on the basis of image data on this image.

A test pattern Tx that has been selected using the first condition and the second condition through the processes of steps S110 and S120 is used. Thus, it is possible to remove a component value of unnecessary frequency component on the basis of the thread-to-thread pitch Pc of the woven fabric. Alternatively, by performing image processing through a band-pass filter configured to remove an unnecessary frequency component based on the thread-to-thread pitch Pc of the woven fabric, a component value of the frequency component based on the thread-to-thread pitch Pc of the woven fabric does not appear in the computation result after the fast Fourier transform computation.

Thus, in step S160, on the basis of the computation result after the fast Fourier transform computation, the CPU acquires the misalignment of the landing position. Step S170 performs computation of a correction value used to correct the acquired misalignment of the landing position. Note that, as for specific computation in steps S160 and S170, it is possible to use a known computing method on an as-necessary basis in accordance with the array of nozzles of the printing head 11 or the positions of nozzles used to print a test pattern.

The embodiment described above prepares a plurality of test patterns T having different ruled line pitches Pk and stored in the storage 23.

However, it is possible to generate a test pattern T having a predetermined ruled line pitch Pk. In this case, in step S120, in a process of acquiring the test pattern Tx on the basis of the first condition or the second condition, a new test pattern T is generated so as to have a ruled line pitch Pk that meets the first condition or the second condition. In addition, in step S130, the newly generated test pattern T is used to perform printing on the woven fabric.

In this case, since a test pattern T that meet the first condition and the second condition is generated, it is possible to remove a component value of an unnecessary frequency component on the basis of the thread-to-thread pitch Pc of the woven fabric. Alternatively, by performing image processing through a band-pass filter configured to remove an unnecessary frequency component based on the thread-to-thread pitch Pc of the woven fabric, a component value of a frequency component based on the thread-to-thread pitch Pc of the woven fabric does not appear in the computation result after fast Fourier transform computation.

In this manner, the control unit 20 is able to generate a ruled line group of a test pattern on the basis of a predetermined parameter, and uses the acquired interval Pc between weaving threads as a parameter to generate a test pattern T such that the interval Pc between weaving threads and the interval between ruled lines constituting a ruled line group in the test pattern do not match.

The present disclosure is not limited to a disclosure relating to a physical object, and can be regarded as a disclosure of a method from the viewpoint of the processing steps thereof. In addition, each of the steps of the method can be clearly understood from the flowchart shown in FIG. 6.

Note that it is needless to say that the present disclosure is not limited to the embodiment described above. It is needless to say that a skilled person in the art should understand that the followings are also disclosed as an embodiment of the present disclosure.

Combinations of members, configurations, and the like that are interchangeable with each other and are disclosed in the embodiment described above are changed on an as-necessary basis, and are applied.

Although no disclosure is made in the embodiment described above, replacement is made, as appropriate, with members, configurations, and the like that are known techniques and are interchangeable with members, configurations, and the like disclosed in the embodiment described above, or the combinations thereof are changed, and are applied.

Although no disclosure is made in the embodiment described above, replacement is made, as appropriate, with members, configurations, and the like that the skilled person in the art can conceive on the basis of known techniques or the like as substitutes for members, configurations, and the like that have been disclosed in the embodiment described above, or the combination thereof is changed, and is applied.

What is claimed is:

1. A recording device comprising:
 a recording unit configured to record, on a woven fabric, a test pattern including a line group having a predetermined interval; and
 a control unit configured to control recording by the recording unit, wherein
 the control unit acquires an interval between weaving threads in the woven fabric,
 the control unit changes an interval between ruled lines constituting the ruled line group in the test pattern on a basis of the acquired interval between weaving threads,
 the control unit forms a plurality of the test patterns,
 the control unit obtains the number of occurrences in which the acquired interval between weaving threads and the interval between ruled lines constituting the ruled line group in each of the test patterns match, and
 the control unit selects, from the individual test patterns, a test pattern having the number of occurrences of matching being the minimum.

2. The recording device according to claim 1, wherein the control unit performs control such that the acquired interval between weaving threads and the interval between ruled lines constituting the ruled line group in the test pattern do not match.

3. The recording device according to claim 1, wherein the control unit is configured to generate the ruled line group of the test pattern on a basis of a predetermined parameter, and
 the control unit uses the acquired interval between weaving threads as the parameter to generate the test pattern such that the interval between ruled lines constituting the ruled line group in the test pattern and the acquired interval between weaving threads do not match.

4. The recording device according to claim 1, wherein the recording unit is configured to drive a printing head in a main scanning direction, drive a recording medium in a sub scanning direction, and cause dot-like color ink to be attached to perform recording,
 the ruled line is formed by aligning the dot-like color ink in a predetermined direction, and
 the ruled line group includes the ruled line in a direction parallel to a direction in which the weaving threads are arrayed.

5. A recording method for a recording device including a recording unit configured to record, on a woven fabric, a test pattern including a ruled line group having a predetermined interval and a control unit configured to control recording by the recording unit, the method including:
 acquiring an interval between weaving threads in the woven fabric; and
 changing an interval between ruled lines constituting the ruled line group in the test pattern on a basis of the acquired interval between weaving threads, wherein
 the control unit forms a plurality of the test patterns,
 the control unit obtains the number of occurrences in which the acquired interval between weaving threads and the interval between ruled lines constituting the ruled line group in each of the test patterns match, and
 the control unit selects, from the individual test patterns, a test pattern having the number of occurrences of matching being the minimum.

* * * * *